United States Patent
Boyce

(10) Patent No.: US 6,649,065 B2
(45) Date of Patent: Nov. 18, 2003

(54) BROMINE BIOCIDE REMOVAL

(75) Inventor: Allen R. Boyce, Portland, OR (US)

(73) Assignee: SEH America, Inc., Vancouver, WA (US)

(*) Notice: Subject to any disclaimer, the term of this patent is extended or adjusted under 35 U.S.C. 154(b) by 0 days.

(21) Appl. No.: 10/108,037

(22) Filed: Mar. 27, 2002

(65) Prior Publication Data

US 2002/0139750 A1 Oct. 3, 2002

Related U.S. Application Data

(63) Continuation of application No. 09/418,880, filed on Oct. 15, 1999, now Pat. No. 6,402,957.

(51) Int. Cl.[7] .............................. B01D 61/00; C02F 1/78
(52) U.S. Cl. ........................ 210/652; 210/760; 210/663; 210/900; 210/748; 210/695; 210/199.1; 210/257.1
(58) Field of Search ................................. 210/650, 652, 210/760, 900, 748, 695, 663; 119/720

(56) References Cited

U.S. PATENT DOCUMENTS

| | | | |
|---|---|---|---|
| 4,169,773 A | 10/1979 | Lai et al. | |
| 4,402,836 A | 9/1983 | Fochtman et al. | |
| 4,818,413 A | 4/1989 | Hoover et al. | |
| 4,872,999 A | 10/1989 | Schild et al. | |
| 4,990,260 A | 2/1991 | Pisani et al. | |
| 5,073,268 A | 12/1991 | Saito et al. | |
| 5,302,356 A | 4/1994 | Shadman et al. | |
| 5,424,032 A | 6/1995 | Christensen et al. | |
| 5,534,107 A | 7/1996 | Gray et al. | |
| 5,558,775 A | 9/1996 | Busch, Jr. | |
| 5,655,483 A | 8/1997 | Lewis et al. | |
| 5,679,257 A | 10/1997 | Coate et al. | |
| 5,783,092 A | 7/1998 | Brown et al. | |
| 5,888,939 A | 3/1999 | Jones et al. | |
| 5,972,293 A | 10/1999 | Kim et al. | |
| 5,997,812 A | 12/1999 | Burnham et al. | |

OTHER PUBLICATIONS

Aquionics, *World Leaders in Ultraviolet Technology, Disinf* (website last modified: Oct. 27, 1998).

M.J. Franklin, D.E. Nivens, A.A. Vass, M.W. Mittelman, R.F. Jack, N.J.E. Dowling and D.C. White, *Effect of Chlorine and Chlorine/Bromine Biocide Treatments on the Number and Activity of Biofilm Bacteria and on Carbon Steel Corrosion, Corrosion*—Feb. 1991.

Edward Ekis, Jr. and Michael Trulear, *Macrofouling, Preventive Strategies for Nuclear and Fossil–Fired Power Plants, Industrial Water Treatmnet*—Jul./Aug. 1992.

Richard Combs, Norman Ammerer, *Chlorine Removal, Ultraviolet Light Oxidation Of Chlorine In Water, Ultrapure Water®, The Definitive Journal for Industrial Water Users*—vol. 15, No. 4, Apr. 1998.

B.D. Fellers, E.L. Flock, J.C. Conley, *Steam Generation–:Bromine Replaces Chlorine In Cooling–Water Treatment, Power*—Jun. 1988.

Primary Examiner—Ana Fortuna
(74) Attorney, Agent, or Firm—Alston & Bird LLP

(57) ABSTRACT

A system and method are provided which removes bromine biocide used in effluent process streams without the use of chemicals or complex mechanical systems. In particular, the system and method of the present invention remove bromine biocide by photodissociating the bromine, thereby forming innocuous salts. Ultraviolet energy may be used to provide the energy for photodissociation, in particular ultraviolet energy supplied by medium pressure Hg vapor lamps.

34 Claims, 5 Drawing Sheets

BROMINE BIOCIDE REMOVAL

CROSS-REFERENCE TO RELATED APPLICATIONS

This application is a continuation of U.S. application Ser. No. 09/418,880, filed Oct. 15, 1999, which is hereby incorporated herein in its entirety by reference now U.S. Pat. No. 6,402,957.

FIELD OF THE INVENTION

This invention pertains to the treatment of industrial process water, and more particularly, to the removal of bromine based biocides in industrial process water streams. Specifically, the invention relates to the removal of bromine based biocides from industrial process water streams using ultraviolet (UV) radiation.

BACKGROUND OF THE INVENTION

A wide variety of industries use water as the coolant for heat transfer processes. A significant quantity of cooling water is used annually by both electrical power plants and manufacturing operations. Typical water cooled heat transfer processes include condensers and chillers. In general, the spent water is recycled to lessen both the economic and environmental impact of these heat transfer processes. This recycling requires the spent water to be cooled back to ambient temperature or slightly below, commonly by means such as a cooling tower. In general, cooling towers allow the spent water to release heat to the ambient air by cascading the spent water down an open air tower.

Cooling water, commonly supplied by a surface water source such as a lake or stream, contains a wide range of contaminants. These contaminants can lead to fouling and subsequent reduction of coolant flow and/or heat transfer efficiency. Minerals, such as calcium, magnesium and silica, can form scale deposits on the insides of pipes and tubes. Bacteria, carried into the cooling water system by wind or make up water, can likewise foul process piping and heat exchange surfaces by creating deposits, or, if left unchecked, a continuous layer of surface slime. Bacterial contamination is particularly troublesome because the heat transfer through heat exchanger surfaces can be significantly reduced, corrosion can occur under the bacterial slime layer, and the tacky nature of the slime layer provides a surface on which minerals can readily deposit.

To control the build up of these contaminants, industries typically subject at least a portion of their process water stream, commonly referred to as a "blowdown stream, to a purification system. In general, process water purification systems are comprised of a series of removal processes, each designed to eliminate specific types of contaminants. For example, minerals may be removed from process water streams by methods such as deionization and reverse osmosis. The presence and growth of microorganisms may be controlled using methods such as oxidation, ultraviolet irradiation, and mechanical cleaning. Oxidation, the traditional method by which to eliminate microorganisms, remains popular today. Oxidizing biocides, such as chlorine and bromine, kill microbial growth by destroying important cellular components within the microorganisms.

Chlorine, first used to purify water in the 1800s, remains the most widely used oxidizing biocide. Chlorine provides its biocidal properties by reacting with water to form hypochlorous acid, a very strong oxidizing agent, in a pH sensitive reaction. However, although chlorine is an effective, easily applied biocide, it has several drawbacks. In 1982 the U.S. Environmental Protection Agency implemented regulations which effectively limited the use and the discharge of chlorine. Further, high concentrations of halogenated biocides, such as those required with chlorine biocides, are known to increase the corrosion of carbon steel. Chlorine is particularly known to corrode copper alloys, widely used in heat exchange equipment. Chlorine is also known to degrade the wood fill used in cooling towers, leading manufacturers to use plastic fill. Further, chlorine is known to form undesirable reaction products with organics and ammonia compounds commonly found in process water streams.

Bromine, introduced as a process water biocide in the 1940's, is an attractive alternative to chlorine. Bromine biocide may be applied to process water in several forms, including as a liquid solution of pure bromine, as a bromine/chlorine mixture, or as a bromide-surfactant package. Recent product advances have resulted in biocide packages containing bromine granules with an equivalent molar ratio of chlorine for quick activation and easy handling. The chlorine is included in the biocide package to react with the bromine in water solution, thus producing hypobromous acid and an innocuous chloride ion via the following non-reversible reaction:

$$HOCl + Br^- \rightarrow HOBr + Cl^- \quad (1)$$

The chloride ion subsequently bonds with available cations in the water solution, such as sodium, to form salts, such as sodium chloride. The hypobromous acid which is formed is a strong oxidizing agent. Hypobromous acid is the active biocide formed by bromine, much as hypochlorous acid is responsible for chlorine's biocidal properties. However, in comparison, bromine dissociates into hypobromous acid much more effectively than chlorine dissociates into hypochlorous acid at higher pHs. In addition, the subsequent biocidal reaction of hypobromous acid is also highly effective at elevated pHs. The biocidal reaction of hypobromous acid in water is:

$$HOBr + R_3CH \rightarrow R_3COH + H^+ + Br^- \quad (2)$$

In cooling towers in which the pH has been elevated with a caustic agent, such as NaOH, the hydronium ion ($H^+$) and bromide ion ($Br^-$) formed in the biocidal reaction (2) combine with the dissociated ions formed by the caustic agent, such as $Na^+$ and $OH^-$, to form a bromide salt, such as $Na^+Br^-$, and water, $H_2O$. These reaction products, i.e., bromide salt and water, are favored, thus driving the biocide reaction (2) to completion. The superior dissociative properties and biocidal activity of bromine is particularly important in applications in which cooling water is supplied by surface waters, which tend naturally to have higher pHs and high nutrient levels for biogrowth.

In addition to greater oxidative efficacy at higher pHs, bromine offers several other significant advantages over chlorine in process water purification, including reduced corrosion to process piping and heat exchanger surfaces and lower vapor pressure. In particular, a lower vapor pressure biocide is advantageous because it reduces the rate of loss of bromine to the atmosphere as the cooling water cascades down through the cooling tower packing.

Although the strong oxidizing power of bromine makes it a highly effective biocide, its oxidative properties have a detrimental impact on other water purification processes downstream. In particular, bromine attacks the deionization resins and reverse osmosis membranes typically used to remove inorganic and organic contaminants. Currently, bromine is removed from process water streams by means of a reducing agent, such as sodium bisulfite. Unfortunately, the use of chemical reagents to remove bromine from a process stream is disadvantageous in that the mechanical system, in particular the pump used to inject the reagent, can potentially fail. Typical pump failures include a mechanical failure of the diaphragm of positive displacement pumps which are typically used, a lack of proper priming on start up after chemical replenishment, power outages, or maintenance down time. Also, injection of a reducing agent is inefficient in purification systems because the compound produced by the reaction of the reducing agent is typically removed downstream by other purification operations. For example, sulfite reaction products, such as those produced by the reaction of sodium bisulfite, must be removed prior to discharging the process water stream back into natural receiving waters, such as a river, lake, or stream. Some aquatic organisms, such as fish, are sensitive to sulfite reaction products, which can impair respiration (oxygen uptake) and liver function. Therefore, there remains a need in the art to convert the bromine biocide used in industrial process water streams into innocuous compounds more reliably and efficiently.

SUMMARY OF THE INVENTION

The present invention provides a system and a method by which bromine biocide may be removed from process water streams without the use of either chemical reagents or complex mechanical systems, thus yielding a significantly more reliable, efficient means of removal which, in turn, provides greater protection for downstream purification equipment. In particular, the present invention employs irradiation to decompose, or photodissociate, bromine biocide present in process water effluent streams, thereby forming innocuous compounds. In a preferred embodiment, UV radiation is used to dissociate bromine biocide in a process water stream, thereby yielding innocuous bromide salts.

In one particularly advantageous embodiment, a water purification system for process water containing bromine biocide is provided comprised respectively of an irradiation chamber, a deionizer, and a separation system for removing suspended solids. By irradiating the effluent water stream, compounds less oxidative than the bromine biocide are formed, thereby protecting the downstream deionizer and separation system from degradation. In one aspect of this embodiment, the irradiation chamber is fitted with an UV light source, such as one or more medium pressure mercury vapor lamps. The irradiation chamber may further be comprised of a stainless steel cylindrical member, such as a pipe, through which the effluent stream continuously flows. In its cylindrical embodiment, the working pressure in the irradiation chamber is up to 100 psi, typically 40 psi, the pressure loss is less than 2 psi, and the mercury vapor lamp is rated generally from about 0.5 to about 40 kW, and more advantageously from about 2 to about 5 kW. In one advantageous aspect of this embodiment, a dwell time of 10 to 20 seconds is provided in the cylindrical stainless steel irradiation chamber.

According to one aspect of the invention, the deionizer is a weak acid cationic exchange resin and the separation system is a reverse osmosis system. In a further embodiment, the water purification system also includes a secondary deionizer, such as a sodium zeolite ion exchange resin. In an alternate embodiment, a secondary system is provided for bromine biocide removal, such as a pump for injecting a reducing agent such as sodium bisulfite. Additionally, the water purification system can optionally include a dearator to remove gases trapped in the deionized water. An alternative of this optional embodiment utilizes an alkaline solution pump for elevating the pH of such dearated waters, thereby ensuring that silica is kept in suspension. Typically, the effluent water stream is provided by a cooling tower, and a pumping system is used to introduce the bromine biocide into the cooling tower feed stream. In one aspect that embodiment, only a fraction of cooling tower water, i.e., a side stream, is treated in the water purification system.

Another aspect of the invention is to provide a method by which to remove bromine biocide from a process water stream using irradiation, especially UV irradiation. In one particular embodiment, an effluent water stream laden with bromine biocide is subjected to UV irradiation in an amount sufficient to form bromide anions. In one aspect of the invention, the irradiation process consists of subjecting effluent water containing bromine biocide to UV energy in the range of about 200 mWs/cm$^2$ to 3500 mWs/cm$^2$. The bromine biocide laden effluent water typically contains from 0.1 mg/l to 3.0 mg/l bromine biocide. In one exemplary embodiment, residual bromine biocide is not detectable in the effluent water stream following the irradiation process of the present invention.

By photodissociating bromine biocide as an initial step in a water purification process, the system and method of the present invention protects downstream purification processes from oxidation more reliably and efficiently. Further, the system and method of the present invention are surprisingly robust, capable of treating water used in normal operations, which is generally quite dirty. Additionally, UV based bromine biocide removal also makes the cooling tower blowdown stream more suitable for discharge to natural receiving waters such as a river, lake or stream.

In a particularly advantageous embodiment, photodissociation is accomplished by subjecting an effluent water stream to a sufficient quantity of UV radiation. The dissociated bromine biocide then forms less oxidative compounds, such as bromide salts, by combining with cations naturally occurring in the effluent water stream. These less oxidative compounds do not attack ion exchange resins or reverse osmosis membranes, which may be present downstream. The present invention thus provides a bromine biocide removal technique, which does not involve complex mechanical systems or the introduction of chemicals, which are subsequently removed.

Further understanding of the processes and systems of the invention will be understood with reference to the brief description of the drawings and detailed description which follows herein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Further, the various control, monitoring, and electrical supply lines have been omitted throughout to improve clarity of presentation and understanding.

Figure 1:
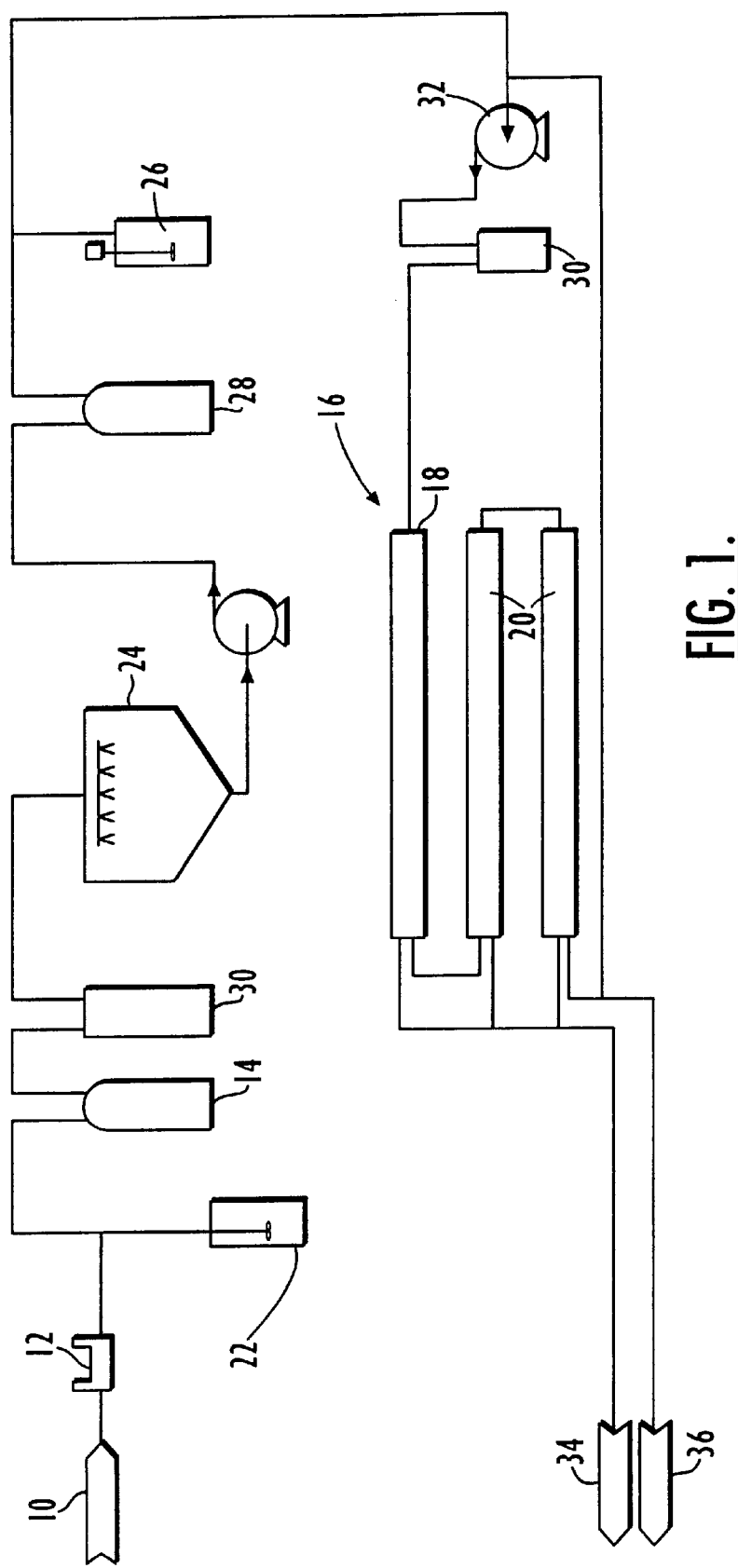
FIG. 1 represents a schematic drawing of a water purification system in accordance with one embodiment of the present invention.

Referring now to FIG. 1, a multi-component water purification system is provided. The system receives an effluent water stream 10 that could be generated by any number of manufacturing processes, which produce water, which must be purified for reuse. In one advantageous embodiment of the present invention, the effluent water stream 10 is provided as a blow down stream from a cooling tower.

Cooling towers are tall, open-air structures used to reduce the temperature of large quantities of effluent water. Cooling towers function by cascading warm water (also referred to as spent water) over a tower containing slat gratings or chevron packing. The slat gratings, or chevron packing, provide surface area for liquid/air contact, and are generally constructed of wood or plastic. The cooled water is collected in a concrete or metal basin at the foot of the tower, and may then be pumped back into the heat transfer process for reuse.

The purpose of cooling towers is to provide a "loop system," in which process water can be recycled indefinitely. However, water losses do occur, in great part due to evaporation. In addition, contaminants which build up in the system over time are typically removed via a "blowdown stream." The blowdown stream diverts a fraction of the cooling water, generally 5 to 20%, from the bottom of the basin. The water comprising the blow down stream may be conserved by subjecting the blow down stream to purification processes and returning the purified water to the cooling tower. Therefore, in a preferred aspect of the invention, a cooling tower blow down stream supplies the effluent water stream to be purified.

As noted earlier, industrial process water in general, and cooling tower water in particular, contains a wide variety of contaminants. These impurities include algae, bacteria, and organics which enter the system from the atmosphere during the cooling process; calcium, magnesium, and silica present in the incoming water source; and phosphonates which are added to keep silica in suspension. Biocide is typically injected into the cooling tower water to kill the algae and bacteria. In the present invention, a bromine biocide is used. Deionization processes 14, 28, particularly those comprising ion exchange resins, are then used to remove calcium and magnesium cations from the process water. Techniques such as reverse osmosis 16 are used to separate out solids such as silica, organics, and phosphonate from deionized water. Due to its high oxidation potential, the bromine biocide used to eliminate bacteria is harmful to these downstream purification processes, in particular the ion exchange resin and reverse osmosis membranes, and must be substantially removed.

Bromine, biocides are available in several forms, including pure bromine, bromine/chlorine mixtures, or as a bromine-surfactant package. The bromine biocide preferably employed in the present invention is pure bromine in its diatomic form or bromine compounded with not more than an equivalent molar ratio of chlorine. Pure bromine may be added by any means known in the art. Further, the bromine biocide may be added at several points within the cooling tower. For example, bromine may be injected as a side stream to the inlet water stream feeding the cooling tower. Conversely, bromine may be supplied to the system by placing pellets in the cooling tower basin or as granules in a side stream flow through cannister.

Typical concentrations of bromine biocide employed in the effluent stream range from about 0.2 to up to 3 mg/L, more typically ranging from 0.2 to 0.5 mg/L. As is known in that art, shock treatments of biocide are occasionally required, such as on a semi-annual basis. Typical concentrations of bromine biocide present during shock treatment range from 3.0 to 5.0 ppm. Although referred to as "pure" bromine, a minor amount of chlorine, such as 0.01 to 0.1 ppm, must be added to the cooling tower water to activate the bromine. The chlorine may be added as a compound with the bromine or separately as either gaseous chlorine or sodium hypochlorite, as is known in the art.

The present invention removes bromine biocide by irradiating the effluent water stream 10 with electromagnetic radiation. Such requisite electromagnetic radiation is supplied to the effluent water stream 10 as it passes through a radiation chamber 12. In a particularly advantageous embodiment, the present invention bombards the bromine biocide with ultraviolet radiation, generally defined as electromagnetic radiation having wavelengths ranging from approximately 100 to 3900 angstroms (Å), or 10 to 390 nm. Broadband UV radiation, in the wavelength range of 240 to 300 nm may be used. Potentially, narrower band sources providing substantial output in the 185.0 or 253.7 nm range may have some applicability.

Figure 2:
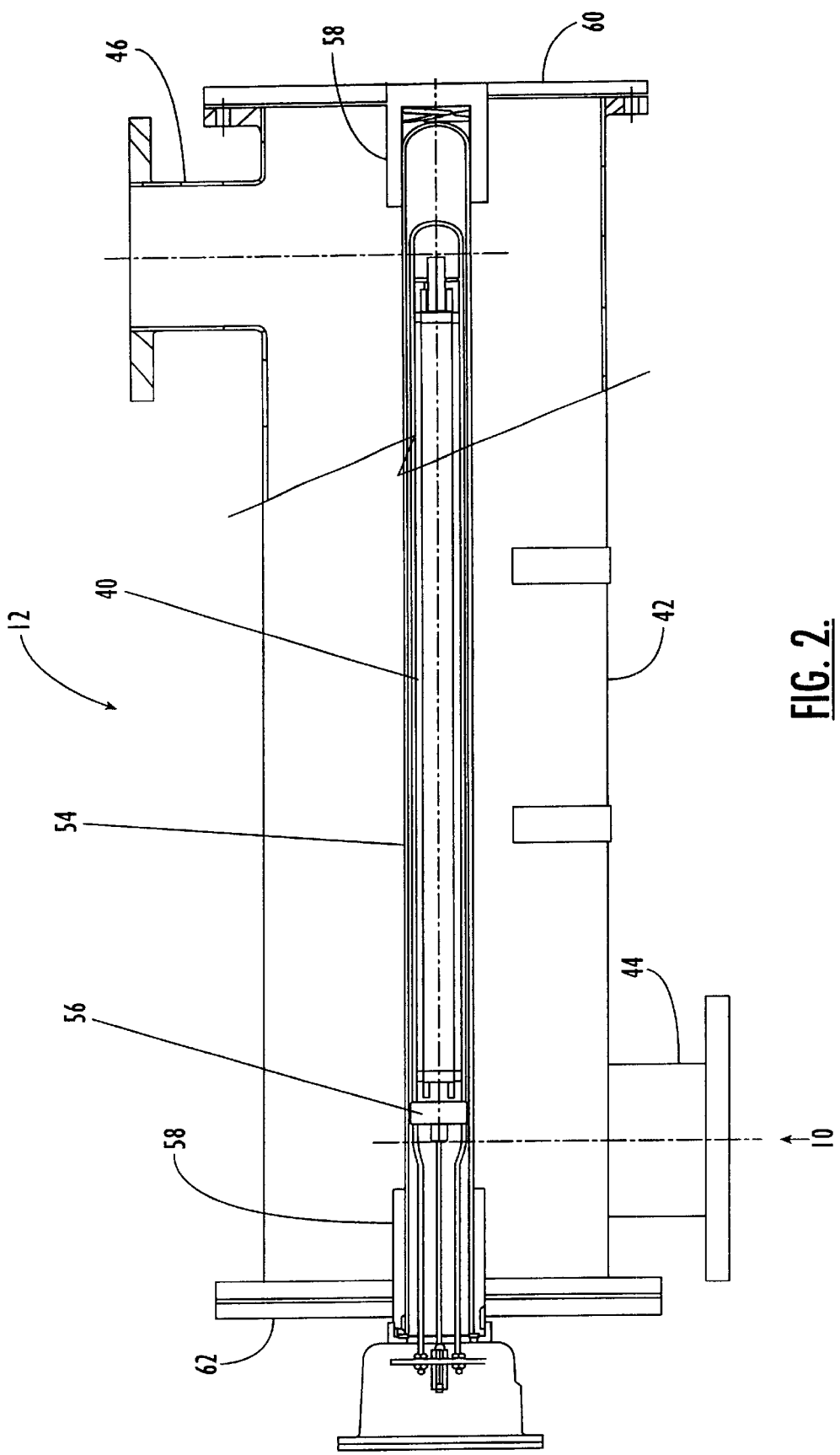
FIG. 2 is a cutaway plan view of an irradiation chamber provided in accordance with one embodiment of the present invention.
Figure 3:
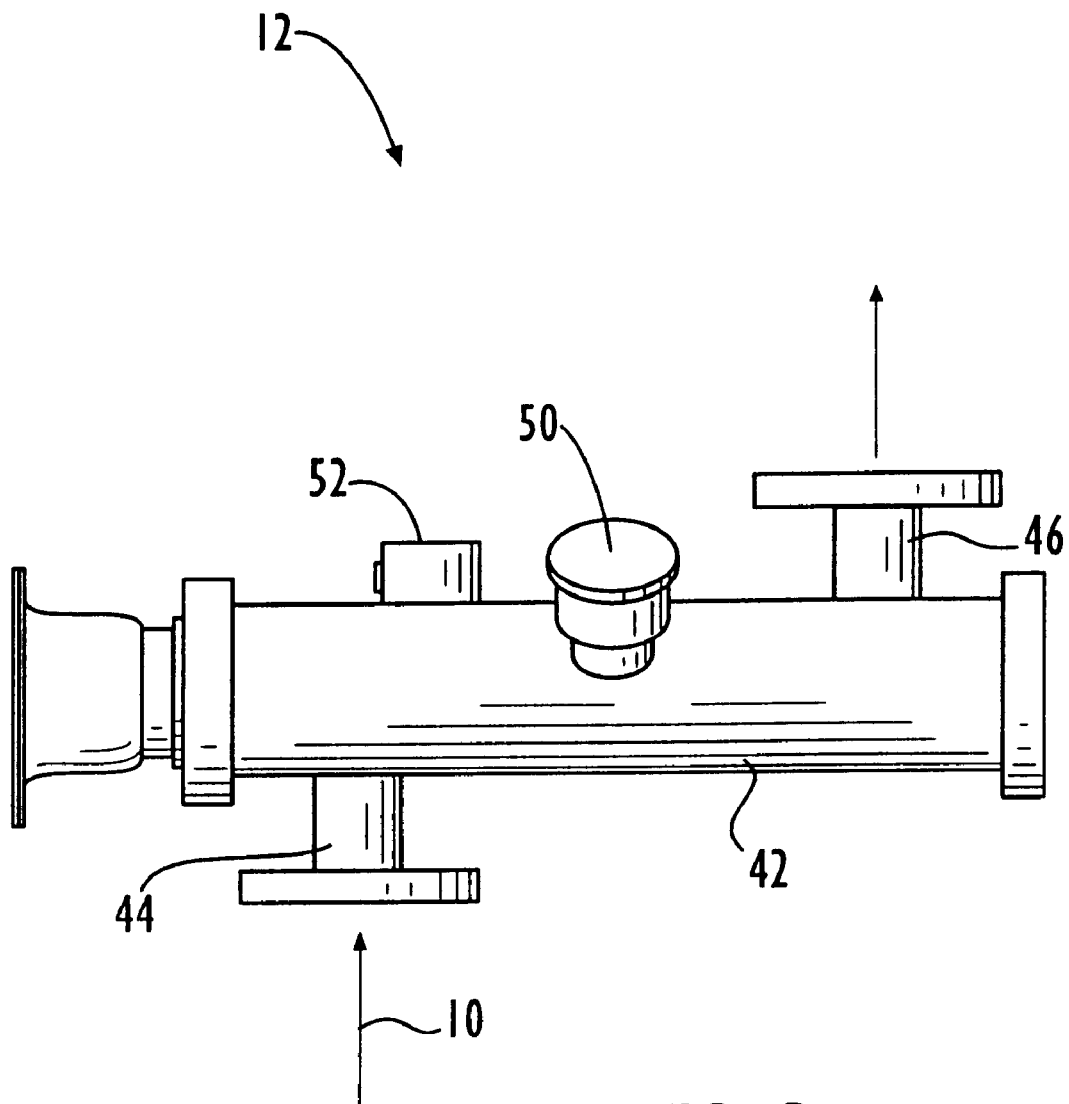
FIG. 3 is a plan view of an irradiation chamber provided in accordance with one embodiment of the present invention.

Referring now to FIGS. 2 and 3, an irradiation chamber 12 in accordance with a particularly advantageous embodiment of the invention is provided. FIG. 2 provides a cut away view of an irradiation chamber 12 in accordance with one embodiment of the present invention. FIG. 3 schematically illustrates further aspects of an irradiation chamber 12 of the present invention, comparable to the irradiation chamber provided in FIG. 2.

Turning first to FIG. 2, the irradiation chamber 12 generally comprises a cylindrical member 42, having opposing ends 60, 62. In general, the purpose of the irradiation chamber 12 is to illuminate the incoming effluent water stream 10 with a UV light source 40, which is preferably protected from the effluent stream by a UV transparent "window." The transparent window provided in the embodiment of FIG. 2 comprises a high purity cylindrical quartz sleeve 54 running the entire center length of the chamber. The UV light source 40 and the quartz sleeve 54, define the longitudinal axis of the cylindrical member 42 and are mounted in concentric, parallel relation to the cylindrical member 42, such that the UV light source 40 most effectively illuminates the effluent water stream 10 as it travels through the irradiation chamber 12. In the embodiment provided in FIG. 2, the effluent water stream 10 immerses the quartz sleeve 54 as the stream flows through the irradiation chamber 12. The quartz sleeve 54 is supported at opposing ends of the irradiation chamber 12 by support members 58. The UV light source 40 is preferably secured within the UV transparent window 54 by a protective collar 56.

Suitable sources of UV radiation include Hg (mercury) vapor discharge lamps and xenon flash lamps. In one particularly advantageous embodiment, medium pressure Hg vapor lamps, producing a preponderance of radiation of wavelengths in the 3000–6000 Å range, are employed. Low pressure Hg vapor lamps, producing primarily 2537 Å radiation, may also be of benefit. In general, Hg vapor lamps rated from about 0.5 to about 40 kW may advantageously be employed in the present invention, and preferably from about 2 to about 5 kW. In one particularly advantageous embodiment, a single medium pressure Hg vapor discharge lamp, rated at 2 kW, is used to treat a 6 to 8 gpm effluent stream. In alternative embodiments, effluent streams of up to 100 gpm or more may be treated using lamps rated up to 40 kW. In further alternative aspects of the present invention, a multiplicity of UV lamps are utilized.

Turning to the embodiment shown in FIG. 3, the irradiation chamber 12 is formed from a cylindrical member 42, such as stainless steel tubing. In particular, the cylindrical member 42 may be formed from 316 L stainless steel tubing. The cylindrical member 42 is fitted with inlet and outlet flanges at its opposing ends, shown respectively as 44 and 46, Such flanges may be of any suitable dimension in porportion to the cylindrical member 42. In one preferred embodiment, such flanges are 3 inches in diameter. In general, the maximum working pressure in the irradiation chamber 12 is 100 psi. In one particular embodiment, the working pressure within the irradiation chamber 12 is 38 psi (206 Bar), and the pressure loss at maximum flow is less than 2 psi (138 mBar). Optionally, the irradiation chamber 12 may be fitted with a UV monitor 50 and a temperature sensor 52. UV irradiation chambers as described above are available commercially from Aquionics as Model No. UV500XP, which provides a 150 mm diameter cylindrical irradiation chamber having a 435 mm flow path.

Although a particular configuration has thus far been described, irradiation chambers having a multitude of configurations are possible, so long as sufficient energy is supplied to the effluent water flowing through the chamber. The amount of energy required may be determined for a given effluent stream empirically by testing the irradiated stream for residual bromine by methods known in the art, such as titration, and adjusting effluent flow rates and energy input accordingly. Bromine biocide is considered to be effectively removed when the residual level of bromine present in the irradiated water stream is less than or equal to 0.1 mg/l. As a general rule, it would be expected that sufficient energy would be imparted to an effluent water stream containing from 0.1 to 0.3 ppm bromine biocide by exposure intensities ranging from 200 to 350 mWs/cm$^2$, preferably 300 mWs/cm$^2$ (referenced to distilled water) for a dwell time of 10 to 20 seconds, preferably 15 seconds. However, as a additional note, the UV light source is preferably sized so as to have the ability to effectively treat bromine spikes of 3 mg/L commonly used for semiannual shock treatments. To effectively treat effluent water streams containing a bromine spike of up to 3 mg/L, UV exposure intensities from 2000 to 3500 mWs/cm$^2$, preferably 3000 mWs/cm$^2$ (referenced to distilled water) are recommended for a dwell time of 10 to 20 seconds, preferably 15 seconds. These dosages are anticipated for a typical cooling tower blowdown stream in an otherwise maintained system whose water stream ranges in color from green to greyish and which has a visibility to several feet in depth. The actual UV dosage applied to bromine biocide present in the turbid water normally encountered in commercial process operations is projected to be ½ to ¼ the applied intensities given above for distilled water. The UV dosage rate may be varied by adjusting the flow rate through the UV unit. The UV dosage rate may be determined using the following formula:

$$D = I \times t_d \quad (3)$$

Where

D is dosage rate in mWs/cm$^2$

I is exposure intensity in mW/cm$^2$ $t_d$ is dwell time in seconds.

The dwell time may further be calculated by dividing the exposed liquid volume by the flow rate.

In general, UV energy is known in the art for use in water purification. As an example, UV has been used for years in the treatment of drinking water to remove bacteria, as taught in U.S. Pat. No. 5,679,257. UV is also known to have a beneficial impact on macrofouling, in particular in controlling zebra mussels and other bivalves, as discussed in U.S. Pat. No. 5,655,483. Chlorine is known to be activated by radiation in the range of 3000 to 6000 Å, as described in U.S. Pat. No. 4,402,836, directed to ultraviolet induced chlorination of hydrazine-fuel contaminated wastewater. Further, UV has been used to photodissociate halogen containing gaseous molecules. Such a use of photodissociation is described in U.S. Pat. No. 5,534,107, in which gases containing chlorine or bromine moities are dissociated using UV.

UV has also been touted as an effective method by which chlorine may be removed from effluent water streams and testing of such applications is ongoing. However, although UV can arguably remove chlorine from otherwise "clean" effluent water streams, it has not been proven effective when used as a primary means of chlorine removal for the "dirty" water encountered in many commercial processes, such as a cooling tower blowdown stream. For further discussion see Richard Combs and Norman Ammerer, *Chlorine Removal-Ultraviolet Light Oxidation Of Chlorine In Water*, 15 ULTRAPURE WATER®, The Definitive Journal For Industrial Water Users, 21 (No. 4, April 1998), hereby incorporated by reference in its entirety. This result may not be altogether surprising, in light of the fact that UV treatment is not recommended for the treatment of turbid water in other applications. In that regard, see U.S. Pat. No. 5,679,257. As noted previously, process water, particularly process water recirculated through a cooling tower, can be quite dirty, containing a range of contaminants, such as high loadings of organics, mineral cations, silica and phosphonates. It is known that cooling tower blowdown streams may contain visible green biogrowth and greyish suspended matter, suspended solids, dissolved solids, and very high levels of bacteria. Suspended particles may be present in amounts of 150,000 particles/liter or more. These particles may range in size from 5 to 500 $\mu$m, with the majority of particles less than 25 $\mu$m. Table 1, shown below, provides a typical suspended solids analysis for a commercial cooling tower stream. In addition, dissolved solids in amounts exceeding 700 mg/l are known. Bacteria may be present in the blowdown stream at $10^3$ counts per milliliter when effective amounts of biocides are used and at greater than $10^7$ counts per milliliter when biocides are ineffective. The presence of these contaminants give rise to a turbid appearance in the effluent water stream.

TABLE 1

| COOLING TOWER SUSPENDED PARTICLE ANALYSIS | | |
|---|---|---|
| Particle Size Range ($\mu$m) | No. of Particles (count/100 ml) | Particle Size Distribution (%) |
| 5 $\mu$m to 15 | 8623 | 57.0 |
| 15 $\mu$m to 25 | 4361 | 28.8 |
| 25 $\mu$m to 50 | 1798 | 11.9 |
| 50 $\mu$m to 100 | 296 | 2.0 |
| 100 $\mu$m to 200 | 12 | <0.5 |
| 200 $\mu$m to 300 | 8 | <0.5 |
| 300 $\mu$m to 400 | 6 | <0.5 |
| 400 $\mu$m to 500 | 2 | <0.5 |
| >500– | 20 | <0.5 |

It is believed that the irradiation process removes bromine biocide from the effluent water stream by photodissociation, i.e., the UV energy causes the bromine present in the hypobromous acid and/or bromine to dissociate into bromide ions. These bromide ions subsequently combine with cations in the effluent water stream, thereby forming innocuous bromide salts. Although not wishing to be bound by theory, it is hypothesized that the superior results achieved with bromine biocide is due to the fact that hypobromous acid in solution has a lower activation energy than hypochlorous acid in alkaline water, i.e. water having a pH>8. This lower activation energy at elevated pHs is believed to be due to the favorable ultimate reaction products, namely bromide salt and water, formed by the hydronium ion and bromide ions produced during the biocidal reaction (2). In the alternative, it is theorized that bromine and/or hypobromous acid may have a lower bond strength than either hypochlorous acid and/or chlorine. It is further hypothesized that bromine and/or hypobromous acid may absorb UV energy more efficiently than hypochlorous acid and/or chlorine. It is believed that any of the inherent molecular differences such as those described above may account for the difference in results noted for the UV irradiation of bromine biocide in comparison to its effectiveness with chlorine biocides.

As noted earlier, the removal of hypobromous acid, a strong oxidizing agent, is highly beneficial for downstream processing equipment. Returning now to FIG. 1, a typical water purification system, comprised of a multi-step process, is shown in which bromine biocide may be effectively removed before it encounters subsequent sensitive purification processes.

One such sensitive process is a deionizer 14, illustrated as treating water exiting the irradiation chamber 12. As is known in the art, deionizers generally remove charged particles from a solution by contacting the solution with ion exchange resins. In the present invention, cations, such as the $Ca^+$ and $Mg^+$ ions naturally present in hard water, are removed from the effluent water stream. The amount of $Ca^+$ and $Mg^+$ ions present in water is commonly referred to as its hardness. In one aspect of this embodiment, the hardness removal is accomplished with a weak acid cationic resin.

To provide additional purification, a secondary deionizer 28 may optionally be employed. Typical secondary deionizers may be comprised of resins such as sodium zeolite. The purpose of the secondary deionizer is to remove any stray $Ca^+$ and/or $Mg^+$ cations which were not removed by the primary deionizer 14. In one embodiment, the secondary deionizer is a bed of sodium zeolite ion exchange resin.

The primary ion exchange process drops the pH of the deionized water stream. This decrease in pH leads to the formation of $CO_2$. A dearator 24 is provided to remove alkalinity from the deionized water stream. As is known in that art, a dearator is generally comprised of an enclosed, elongated vessel in which liquid containing entrained gases is introduced into the top section of the vessel via a series of spray nozzles. The liquid is allowed to free fall into the bottom section of the vessel, where it is subsequently pumped out. During free fall, gases trapped within the liquid are released and discharge vertically into the head space above the dearated liquid. As known in the art, the liquid may be distributed with gravity trays rather than nozzles, and may fall over plastic packing balls of various sizes and shapes, rather than free fall. Other advances in dearation, such as enclosing the vessel and pulling a vacuum on the gas, and/or applying a membrane between the liquid and the vacuum may be employed. Further, the use of sparging or sweep gas is known.

In the embodiment illustrated in FIG. 1, the dearated water is subjected to a reverse osmosis process 16 to separate out dissolved solids in the effluent water stream. Reverse osmosis processes are well known in the art. Reverse osmosis generally involves the use of high pressure to force a solution through a semipermeable membrane which has been designed to allow only the solvent to pass through. In the present invention, effluent water containing dissolved solids such as silica and bromide salts, is forced through thin film semipermeable membranes. Such thin film semipermeable membranes are described in U.S. Pat. No. 5,925,255 to Mukhopadhyay, hereby incorporated by reference. In the embodiment in FIG. 1, a series of semipermeable membranes forms the reverse osmosis system. In particular, a single section 4 inch diameter semipermeable membrane 18 is followed by two sections of 2½ inch diameter semipermeable membrane 20. Each section is 120 inches long, comprised of three 40 inch membranes of a given diameter, joined end to end. These membranes are designed to filter out 100% of suspended particles and the majority of dissolved solids. In a preferred embodiment of that aspect, a pump 32 is used to apply about 500 psig pressure to the effluent water stream entering the reverse osmosis process. To conserve the effluent water stream, concentrated solution may optionally be recirculated continuously within the reverse osmosis process 16, thereby ensuring optimal removal of process water from the sludge stream.

To avoid premature fouling of the semipermeable membranes, it is considered beneficial to maintain silica in suspension during the reverse osmosis process. It is widely known in the art that silica solubility is directly proportional to the pH and that silica may be maintained in aqueous solutions by raising the pH. Therefore, in one embodiment of the present invention, an alkaline solution system 26 is provided to maintain and inject alkaline solution into the effluent stream as appropriate. In one aspect of this embodiment, a sufficient amount of a 25% by weight sodium hydroxide solution is added to the effluent water stream to maintain a constant pH of approximately 11.

In a further embodiment of the present invention, a system for injecting a reducing agent into the effluent stream 22 is provided. Such a reducing agent system may be useful to provide additional bromine biocide removal during shock treatments, as well as for use in periods in which the irradiation chamber 12 has been taken out of service. In one aspect of this embodiment, a 2.4% by weight sodium bisulfite solution is used as the reducing agent. A quantity of sodium bisulfite solution sufficient to eliminate any residual bromine biocide is added by means such as a pump, as is known in that art.

Polishing filters 30 may also be utilized to remove fine particles suspended in the effluent water stream. In particular, one or more 1 micron filters formed from poly (ethylene) terephthalate fiber may be of benefit for use in the present invention.

Following the reverse osmosis process 16, the purified water is returned to the process water stream 34 for reuse. Only highly concentrated sludge is sent to the sewage system 36. Under typical operating conditions, about 90% of the water supplied by the effluent stream 10 is returned to the system as purified water 34 and about 10% is disposed of in the sewer 36. Therefore, under typical operating conditions, for a cooling tower supplying a 10 to 40 gpm blow down stream to the water purification process, approximately 9 to 36 gpm water would be recycled, while only 1 to 4 gpm water would require neutralization and discharge to the sewer or an evaporation pond.

By providing a more reliable method of bromine biocide removal, the useful life of both the deionization and reverse osmosis processes commonly utilized in water purification systems is extended. These purification processes, along with the bromine biocide which must ultimately be removed from the system, allow enormous quantities of process water to be recycled indefinitely. Therefore, the more efficient, reliable method of bromine biocide removal of the present invention provides significant economic and environmental benefits.

The present invention will be further illustrated by the following non-limiting examples.

EXAMPLE 1

Samples 1 through 11 were purified using a pilot plant water purification system having a configuration comparable to that provided in FIG. 1. Namely, the pilot plant purification system consisted of an irradiation chamber, a primary ion exchange resin system, a dearator, a secondary ion exchange system, a sodium hydroxide pump, and a reverse osmosis process. Samples were irradiated in a model UV500XP irradiation chamber from Aquionics Company, using a 2 kW medium pressure Hg vapor lamp, applying a dosage level of from about 2000 to about 3000 mWs/cm$^2$ referenced to distilled water. As noted previously, the effective dosage imparted to the bromine biocide present in commercial process water streams is expected to be one half to one fourth the applied dosage referenced to distilled water, due to the turbidity encountered in such process water streams. This turbidity is primarily due to suspended solids and other contaminants. The primary ion exchange system contained 20 ft$^3$ of a weak acid cationic resin. The dearator was rated at 500 gallon capacity. The secondary ion exchange system contained 3.5 ft$^3$ of sodium zeolite resin. The pH entering the reverse osmosis process was maintained at about 11 using a NaOH solution. The reverse osmosis process consisted of 120 inches of 4" diameter thin film membrane followed by two sections of 120 inches of 2.5" diameter thin film membrane. These thin film membranes were generally comprised of polyamide material, and were pervious to water, but impervious to suspended solids and the majority of dissolved solids. The typical rejection for dissolved solids is 90%.

The bromine biocide added to the system was a chlorine/bromine mixture from Great Lakes Water Treatment, tradename Bromicide™, added as a 0.2% by weight solution using granules placed in a 1 cu. ft. sidestream bottle. The bromine was activated with an equivalent molar ratio of chlorine, included in the granules. The bromine biocide was added to water typical of that found in cooling tower operation and commonly considered "dirty" water. Namely, the water used in the samples had a pH of 8.3 and above; Total Dissolved Solids (TDS) values from 503 to 716 mg/l; total hardness from 250 to 385 mg/l; total organic carbon (TOC) from 9.14 to 15.7 mg/l; and silica levels from 130 to 152 mg/l. The residual bromine remaining in the sample following irradiation was determined by a LAMOTT's bromine color comparator (DPD method) with a range of 0.1 to 3.0 mg/L from samples taken immediately following the irradiation process. The results are provided in Table 2 and graphically illustrated in FIG. 4. As shown by the results in Table 2 and FIG. 4, bromine biocide can be effectively removed at effluent flow rates of up to 8.4 gpm using a single 2 kw mercury vapor discharge lamp.

COMPARATIVE EXAMPLES

Comparative Examples, samples 12, 13, 14 and 15 are provided in Table 3, indicating the effectiveness of UV irradiation as a dechlorination technique for an IPA scrubber tower effluent stream. The Comparative Examples were prepared using full scale equipment similar to the pilot plant UV unit described in Example 1. The UV irradiation chamber was a UV850XXP by Aquionics with a medium pressure UV lamp rated at 5.0 KW, which applied a UV dosage of about 1575 mWs/cm$^2$ to water flowing through UV unit at a rate of about 81 gpm. Chlorine biocide in the form of sodium hypochlorite was added to the inlet water stream. In Samples 12, 13, 14 and 15 "clean" city water was used as makeup to an IPA scrubber during testing. The water irradiated in Samples 12–15 had a TDS of 68 mg/l and IPA at 1500 mg/l. Chlorine concentration was determined using a HACH DR100 calorimeter test kit, DPD method.

Figure 5:
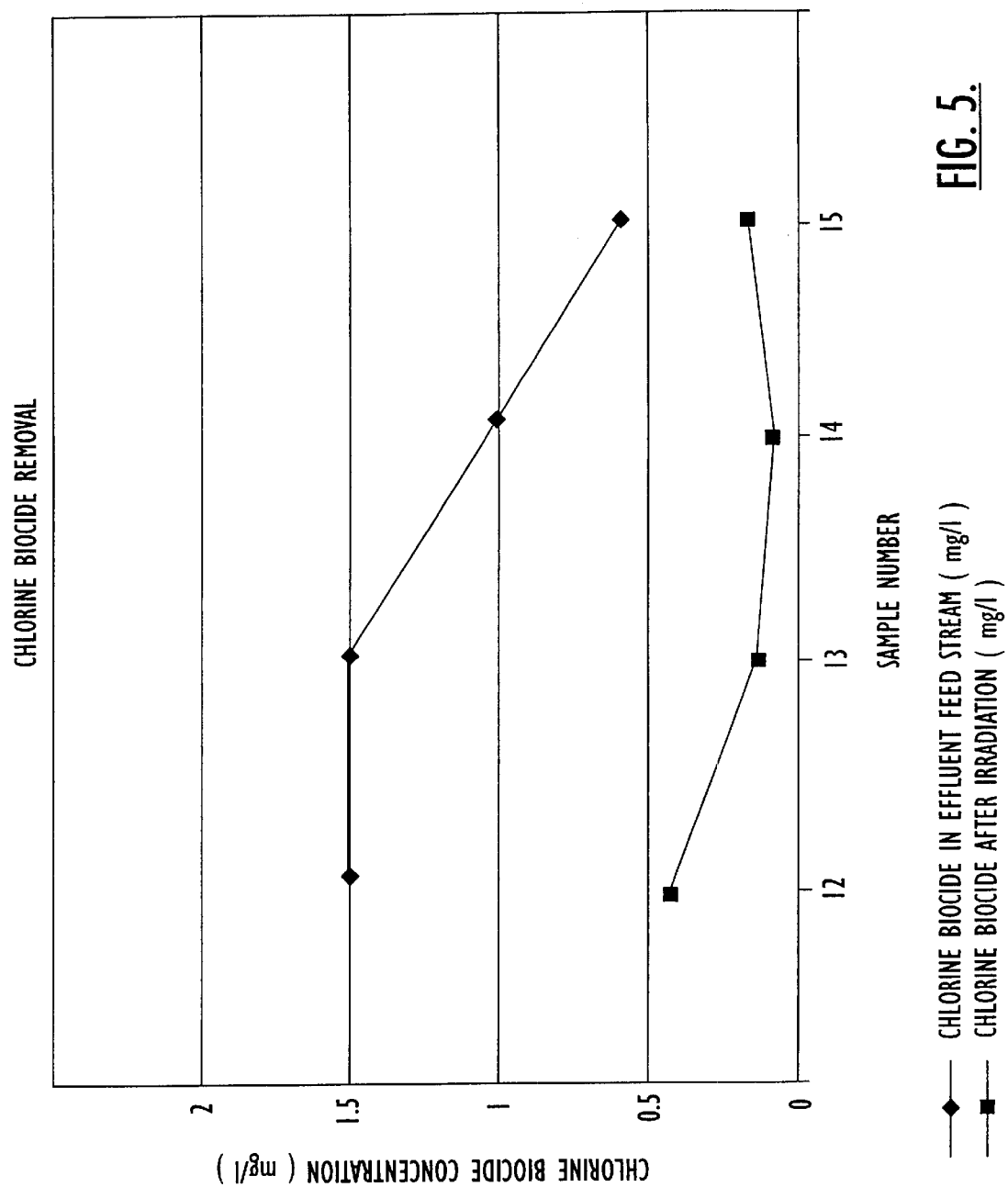
FIG. 5 is a graphical representation of the data in Table 2.

The results are provided in Table 3 and graphically illustrated in FIG. 5. A comparison of Samples 12, 13, 14 and 15 indicates that UV radiation is not effective at removing the chlorine biocide contained in even this relatively clean water. In particular, as shown in Sample 14, the minimum residual chlorine level achieved for the Comparative Examples was an unacceptable 0.10 mg/l. Further, these Comparative Examples represent a "best case" scenario because the water used in the Comparative Examples was relatively "clean," having a TDS of only 68 mg/l. As noted earlier, the presence of dirty or turbid water, having by definition high solids levels, is known to have a detrimental impact on the effectiveness of UV treatment. Therefore, these results indicate that UV irradiation would not be an effective means by which to remove chlorine from normal process water streams, which typically contain much higher solids levels than the Comparative Examples.

Figure 4:
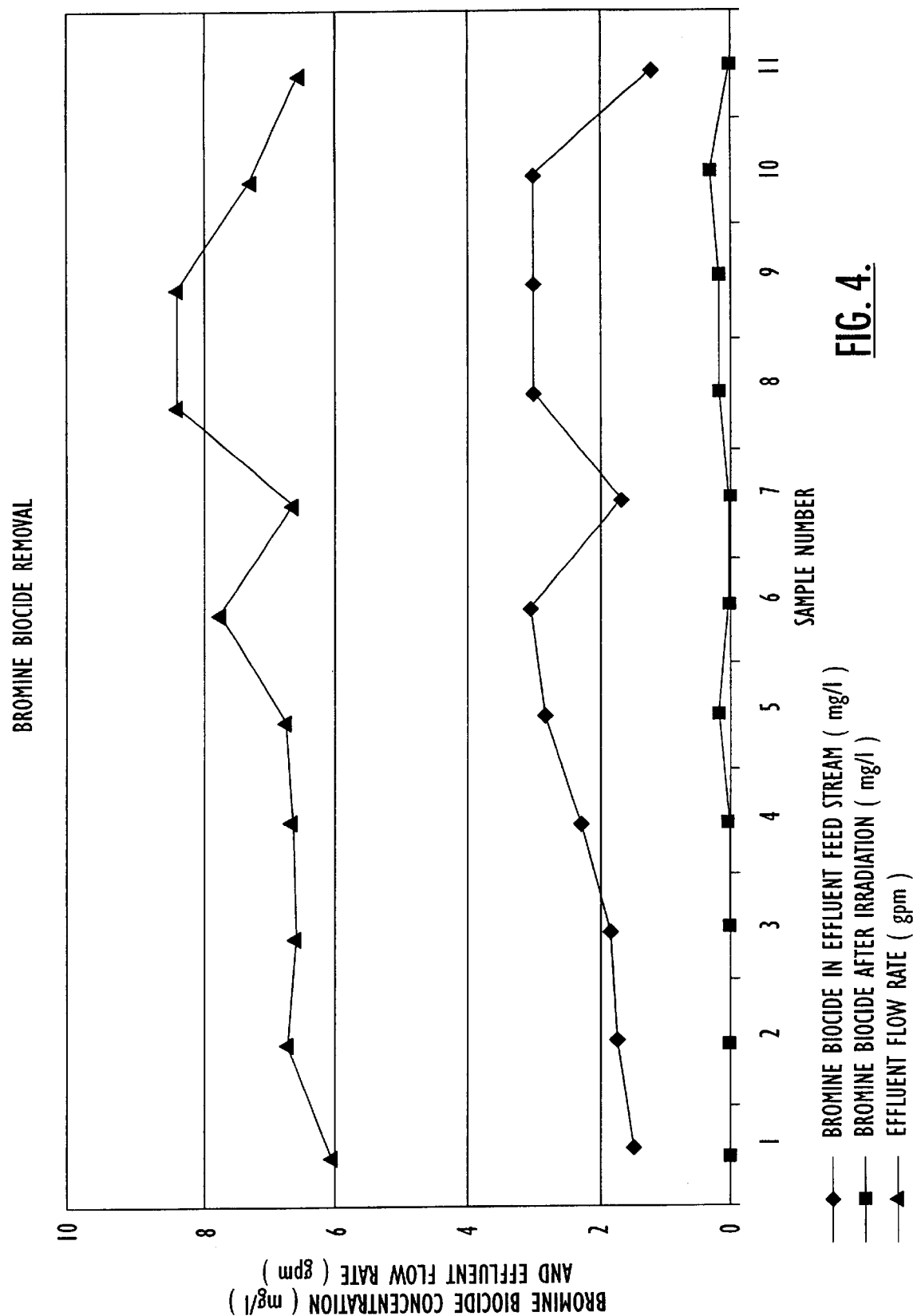
FIG. 4 is a graphical representation of the data in Table 1.

In contrast, the results provided in Table 2 and FIG. 4 indicate that UV irradiation is effective for removing bromine biocide from process water streams comparable to normal operating conditions. In fact, bromine biocide at concentrations of up to 2.2 mg/l have been effectively removed from water having a minimum TDS of 503 mg/l, a solids level comparable to the turbidity of commercial process water. Detectable residual bromine biocide remains only in Samples having inlet bromine biocide concentrations comparable to "spike" conditions, i.e., those samples having an inlet concentration of 2.8 mg/l or more. It is believed that higher UV dosage levels would eliminate residual bromine biocide even during these "spike" conditions. Therefore, UV irradiation has been found to be an effective means by which to remove bromine biocide from process water streams used in normal facilities operations, such as scrubbers and cooling towers.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

TABLE 2

BROMINE BIOCIDE REMOVAL BY UV IRRADIATION FOR COOLING TOWER BLOWDOWN

| Sample | Bromine Biocide In Effluent Feed Stream (mg/l) | Bromine Biocide After Irradiation (mg/l) | Effluent Flowrate (gpm) |
|---|---|---|---|
| 1 | 1.5 | 0 | 6.05 |
| 2 | 1.7 | 0 | 6.70 |
| 3 | 1.8 | 0 | 6.60 |
| 4 | 2.2 | 0 | 6.60 |
| 5 | 2.8 | 0.1 | 6.70 |
| 6 | 3.0 | 0 | 7.70 |
| 7 | 1.7 | 0 | 6.55 |
| 8 | 3.0 | 0.1 | 8.4 |
| 9 | 3.0 | 0.1 | 8.4 |
| 10 | 3.0 | 0.2 | 7.3 |
| 11 | 1.25 | 0 | 6.55 |

TABLE 3

CHLORINE BIOCIDE REMOVAL BY UV IRRADIATION AT IPA SCRUBBER TOWER

| Sample | Chlorine Biocide In Effluent Feed Stream (mg/l) | Chlorine Biocide After Irradiation (mg/l) |
|---|---|---|
| 12 | 1.5 | 0.4 |
| 13 | 1.5 | 0.15 |
| 14 | 1.0 | 0.10 |
| 15 | 0.6 | 0.15 |

That which is claimed:

1. A water purification system comprising:
   means for providing bromine biocide to a cooling tower effluent water stream;

a single irradiation chamber consisting essentially of an ultraviolet radiation source providing radiation ranging in intensity from about 200 mWs/cm to 3,500 mWs/cm$^2$ for treating said bromine biocide present in said effluent water stream in an amount ranging from about 0.2 to 5.0 ppm, thereby forming compounds which are less oxidative than said bromine biocide, said effluent water stream flowing through said irradiation chamber exhibiting a turbid appearance and the residual level of bromine biocide present in the irradiated effluent water stream exiting the irradiation chamber is less than or equal to 0.1 mg/l;

a deionizer for removing hardness in the form of cations present in said irradiated water; and a separation system for removing suspended and dissolved solids from said deionized water;

whereby said formation of compounds which are less oxidative than said bromine biocide protects said deionizer and said separation system from degradation by said bromine biocide.

2. The water purification system of claim 1, wherein said irradiation chamber further comprises an ultraviolet light source.

3. The water purification system of claim 2, wherein said ultraviolet light source is a single medium pressure mercury vapor lamp.

4. The water purification system of claim 3, wherein said irradiation chamber further comprises a stainless steel cylindrical member having an inlet for allowing untreated water to enter chamber and an outlet for allowing irradiated water to exit said chamber.

5. The water purification system of claim 4, wherein said stainless steel cylindrical member provides a dwell time of 10 to 20 seconds.

6. The water purification system of claim 4, wherein the working pressure in said irradiation chamber is no greater than 100 psi, the pressure loss at maximum flow is less than 2 psi, and said mercury vapor lamp is rated from about 0.5 to about 40 kW.

7. The water purification system of claim 6, wherein said mercury vapor lamp is rated from about 2 to about 5 kW.

8. The water purification system of claim 4, wherein said ultraviolet light source comprises a multiplicity of medium pressure mercury vapor lamps.

9. The water purification system of claim 1, wherein said deionizer comprises a weak acid cationic ion exchange resin for removing hardness.

10. The water purification system of claim 1, wherein said separation system comprises a reverse osmosis system.

11. The water purification system of claim 1, further comprising a pump for injecting a reducing agent into said irradiated water.

12. The water purification system of claim 1, further comprising a dearator to remove gases trapped in said deionized water.

13. The water purification system of claim 12, further comprising an alkaline solution pump for elevating the pH of said dearated water.

14. The water purification system of claim 13, further comprising:
a cooling tower providing said effluent water stream; and
a bromine biocide pump to introduce bromine biocide into a cooling tower feed stream.

15. The water purification system of claim 14, wherein said cooling tower diverts 5 to 20% of its total volume of water, thereby providing said effluent water stream.

16. The water purification system of claim 14, further comprising a secondary deionizer for hardness removal.

17. A water purification method comprising:
introducing bromine biocide into a cooling tower effluent water stream in an amount ranging from about 0.2 to 5.0 ppm;

irradiating bromine biocide contained in said effluent water stream with radiation consisting essentially of ultraviolet radiation emitted from a single irradiation chamber ranging in intensity from about 200 mWs/cm$^2$ to 3,500 mWs/cm$^2$, said effluent water stream flowing through said irradiation chamber exhibiting a turbid appearance and the residual level of bromine biocide present in the irradiated effluent water stream exiting the irradiation chamber is less than or equal to 0.1 mg/l;

allowing said irradiated bromine to react with cations contained in said effluent stream, thereby forming compounds which are less oxidative than said bromine biocide;

removing ions from said effluent water stream following formation of said less oxidative compounds to merely soften the water; and separating suspended and dissolved solids from said softened water, whereby said formation of compounds which are less oxidative than said bromine biocide protects the apparatus used in said ion removal and separating steps from degradation by said bromine biocide.

18. The method of claim 17, wherein said irradiating step comprises exposing said bromine biocide contained in said effluent water stream to ultraviolet light.

19. The method of claim 18, wherein said irradiating step comprises exposing said bromine biocide to ultraviolet radiation in an amount sufficient to form bromide anions.

20. The method of claim 19, wherein said irradiating step further comprises exposing said bromine biocide to an intensity of ultraviolet radiation in the range of about 200 mWs/cm$^2$ to 3,500 mWs/cm$^2$.

21. The method of claim 17, wherein said step of removing ions comprises subjecting said effluent water to an ion exchange process.

22. The method of claim 21, wherein subjecting said effluent water to said ion exchange process comprises contacting said effluent water with a weak acid cationic ion exchange resin.

23. The method of claim 17, wherein said step of separating comprises subjecting said deionized water to a reverse osmosis process.

24. The water purification method of claim 23, further comprising raising the pH of said effluent water stream prior to entering said reverse osmosis process.

25. The water purification method of claim 17, further comprising dearating said deionized water.

26. The water purification method of claim 17, further comprising:
subjecting said deionized water to a secondary deionization process; and
reacting residual bromine biocide present in the irradiated effluent water stream with a reducing agent.

27. The water purification method of claim 17, further comprising providing a bromine biocide laden effluent water prior to said irradiating step, whereby said bromine biocide is supplied in an amount ranging from about 0.1 mg/l to 3.0 mg/l.

28. The water purification method of claim 27, wherein said allowing step permits said irradiated bromine biocide to react to an extent such that less than 0.1 mg/l residual bromine biocide is present in said separated water.

29. A water purification system comprising:
an irradiation means for treating bromine biocide present in a turbid effluent water stream in an amount ranging from about 0.2 to 5.0 ppm, thereby forming compounds which are less oxidative than said bromine biocide, wherein said irradiation means consists essentially of an irradiation chamber, an ultraviolet light source, an inlet for allowing untreated effluent water to enter said chamber and an outlet for allowing irradiated effluent water to exit said chamber, the residual level of bromine biocide present in the irradiated effluent stream exiting the irradiation means is less than or equal to 0.1 mg/l;

a deionizer for removing hardness in the form of cations present in said irradiated water; and a separation system for removing suspended and dissolved solids from said deionized water;

whereby said formation of compounds which are less oxidative than said bromine biocide protects said deionizer and said separation system from degradation by said bromine biocide.

30. A water purification system comprising:

a single irradiation chamber consisting essentially of an ultraviolet radiation source for treating bromine biocide present in a turbid cooling tower effluent stream in an amount ranging from about 0.2 to 5.0 ppm, thereby forming compounds which are less oxidative than said bromine biocide, the residual level of bromine biocide present in the irradiated effluent water stream exiting the irradiation chamber is less than or equal to 0.1 mg/l;

a deionizer for removing hardness in the form of cations present in said irradiated water; and a separation system for removing suspended and dissolved solids from said deionized water;

whereby said formation of compounds which are less oxidative than said bromine biocide protects said deionizer and said separation system from degradation by said bromine biocide.

31. A water purification system comprising:

means for providing bromine biocide to an effluent water stream;

a single irradiation chamber for treating said bromine biocide present in said effluent water stream in an amount ranging from about 0.2 to 5.0 ppm, thereby forming compounds which are less oxidative than said bromine biocide, said irradiation chamber consisting essentially of an ultraviolet radiation source providing radiation ranging in intensity from about 200 mWs/cm$^2$ to 3,500 mWs/cm$^2$ for a dwell time of about 10 to 20 seconds, said effluent water stream flowing through said irradiation chamber exhibiting a turbid appearance and the residual level of bromine biocide present in the irradiated effluent water stream exiting the irradiation chamber is less than or equal to 0.1 mg/l;

a deionizer for removing hardness in the form of cations present in said irradiated water; and a separation system for removing suspended and dissolved solids from said deionized water;

whereby said formation of compounds which are less oxidative than said bromine biocide protects said deionizer and said separation system from degradation by said bromine biocide.

32. A water purification method comprising:

introducing bromine biocide into an effluent water stream in an amount ranging from about 0.2 to 5.0 ppm;

irradiating bromine biocide contained in said effluent water stream with radiation consisting essentially of ultraviolet radiation emitted from a single irradiation chamber ranging in intensity from about 200 mWs/cm$^2$ to 3,500 mWs/cm$^2$ for a dwell time of about 10 to 20 seconds, said cooling tower effluent stream flowing through said radiation exhibiting a turbid appearance and the residual level of bromine biocide present in the irradiated water stream exiting the radiation is less than or equal to 0.1 mg/l;

allowing said irradiated bromine to react with cations contained in said effluent stream, thereby forming compounds which are less oxidative than said bromine biocide;

removing ions from said effluent water stream following formation of said less oxidative compounds to merely soften the water; and separating suspended and dissolved solids from said softened water, whereby said formation of compounds which are less oxidative than said bromine biocide protects the apparatus used in said ion removal and separating steps from degradation by said bromine biocide.

33. A water purification system comprising:

means for providing bromine biocide to a cooling tower effluent water stream, said effluent water steam exhibiting a pH of greater than 8.0;

a single irradiation chamber consisting essentially of an ultraviolet radiation source providing radiation ranging in intensity from about 200 mWs/cm$^2$ to 3500 mWs/cm$^2$ treating said bromine biocide present in said effluent water stream in an amount ranging from bout 0.2 to 5.0 ppm, thereby forming compounds which are less oxidative than said bromine biocide, said effluent water stream flowing through said irradiation chamber exhibiting a turbid appearance and the residual level of bromine biocide present in the irradiated effluent water stream exiting the irradiation chamber is less than or equal to 1 mg/l;

a deionizer for removing hardness in the form of cations present in said irradiated water; and a separation system for removing suspended and dissolved solids from said deionized water;

whereby said formation of compounds which are less oxidative than said bromine biocide protects said deionizer and said separation system from degradation by said bromine biocide.

34. A water purification method comprising:

introducing bromine biocide into a cooling tower effluent water stream in an amount ranging from about 0.2 to 5.0 ppm, said effluent water stream exhibiting a pH of greater than 8.0;

irradiating bromine biocide contained in said effluent water stream with radiation consisting essentially of ultraviolet radiation emitted from a single irradiation chamber ranging in intensity from about 200 mWs/cm$^2$ to 3,500 mWs/cm$^2$, said effluent water stream flowing though said irradiation chamber exhibiting a turbid appearance and the residual level of bromine biocide present in the irradiated effluent water stream exiting the irradiation chamber is less than or equal to 0.1 mg/l;

allowing said irradiated bromine to react with cations contained in said effluent stream, thereby forming compounds which are less oxidative than said bromine biocide;

removing ions from said effluent water stream following formation of said less oxidative compounds to merely soften the water; and separating suspended and dissolved solids from said softened water, whereby said formation of compounds which are less oxidative than said bromine biocide protects the apparatus used in said ion removal and separating steps from degradation by said bromine biocide.

* * * * *

UNITED STATES PATENT AND TRADEMARK OFFICE
CERTIFICATE OF CORRECTION

PATENT NO. : 6,649,065 B2 Page 1 of 1
DATED : November 18, 2003
INVENTOR(S) : Boyce It is certified that error appears in the above-identified patent and that said Letters Patent is hereby corrected as shown below:

Title page,
Item [56], References Cited, OTHER PUBLICATIONS, "Treatmnet" should read -- Treatment --.

Column 1,
First paragraph, should appear as follows:
-- This application is a continuation of U.S. application Ser. No. 09/418,880, filed Oct. 15, 1999, now U.S. Pat. No. 6,402,957, which is hereby incorporated herein in its entirety by reference. --.

Column 13,
Line 3, "mWs/cm" should read -- $mWs/cm^2$ --.
Line 42, "claim 4" should read -- claim 2 --.

Column 16,
Line 23, "steam" should read -- stream --;
Line 28, before "treating" insert -- for --;
Line 29, "bout" should read -- about --;
Line 36, "1" should read -- 0.1 --.

Signed and Sealed this

Ninth Day of March, 2004

JON W. DUDAS
*Acting Director of the United States Patent and Trademark Office*